(12) United States Patent
Ratte et al.

(10) Patent No.: US 6,325,136 B1
(45) Date of Patent: Dec. 4, 2001

(54) BISMUTH AND BISMUTH ALLOY FISHING SINKER

(75) Inventors: Robert W. Ratte, North Oaks; Douglas P. Ferron, White Bear Lake; Thomas P. Donohoe, St. Paul, all of MN (US); Geoffrey F. Ratte, Metairie, LA (US)

(73) Assignee: Water Gremlin-Co., White Bear Lake, MN (US)

( * ) Notice: Subject to any disclaimer, the term of this patent is extended or adjusted under 35 U.S.C. 154(b) by 0 days.

(21) Appl. No.: 09/543,203

(22) Filed: Apr. 5, 2000

Related U.S. Application Data

(60) Provisional application No. 60/129,464, filed on Apr. 15, 1999.

(51) Int. Cl.[7] ............................................. B22D 23/00
(52) U.S. Cl. ................................. 164/129; 164/131
(58) Field of Search ................................. 164/129, 130, 164/131, 132, 262, 264, 265

(56) References Cited

U.S. PATENT DOCUMENTS

| | | | |
|---|---|---|---|
| 3,283,376 | * 11/1966 | Hockin | 164/129 |
| 3,786,857 | * 1/1974 | Sutherland | 164/129 |
| 5,081,786 | 1/1992 | Cobb | 43/44.89 |
| 5,081,997 | 1/1992 | Bosley, Jr. et al. | 128/662.02 |
| 5,201,314 | 4/1993 | Bosley et al. | 128/662.02 |
| 5,289,831 | 3/1994 | Bosley | 128/899 |
| 5,412,901 | 5/1995 | Matinez | 43/42.22 |
| 5,537,775 | 7/1996 | Crumine | 43/42.38 |
| 5,719,352 | 2/1998 | Griffin | 102/517 |
| 5,760,331 | 6/1998 | Lowden et al. | 102/506 |
| 5,786,416 | 7/1998 | Gardner et al. | 524/440 |
| 5,824,209 | 10/1998 | Arand et al. | 208/135 |
| 5,833,160 | 11/1998 | Enomoto et al. | 242/348 |
| 5,837,120 | 11/1998 | Forand et al. | 205/93 |
| 5,881,482 | 12/1998 | Kim | 420/557 |

OTHER PUBLICATIONS

"Bismuth", Brown Jr., Robert D.11 pages, from *U.S. Geological Syrvey—Minerals Information*—1997.

* cited by examiner

*Primary Examiner*—Kuang Y. Lin
(74) *Attorney, Agent, or Firm*—Jacobson & Johnson

(57) ABSTRACT

An improved fishing sinker having a specific gravity sufficiently high so as to provide sufficient weight without undue bulkiness with the fishing sinker having a body of material formed from bismuth or an alloy of bismuth and a method of casting a bismuth containing sinker in order to have the sinker release from the mold as well as a method of forming a runner attachment to the fishing sinker to enable quick and clean removal of the solidified runner from the solidified fishing sinker.

12 Claims, 1 Drawing Sheet

BISMUTH AND BISMUTH ALLOY FISHING SINKER

CROSS REFERENCE TO RELATED APPLICATION

This application claims priority from provisional patent application Ser. No. 60/129,464 titled Bismuth and Bismuth Alloy Fishing Sinker filed Apr. 15, 1999.

FIELD OF THE INVENTION

This invention relates generally to sinkers and, more specifically, a bismuth or bismuth alloy fishing sinker and a method of making a bismuth or bismuth alloy fishing sinker.

BACKGROUND OF THE INVENTION

One of the common types of fishing sinkers is made of lead, as lead is both inexpensive and easily configurable for attachment to a fishing line. From time to time, concerns about toxicity caused by lead in the environment has led to a search for substitute materials to be utilized in fishing sinkers. However, other materials lack the high specific gravity of lead and are therefore less desirable, consequently, lead continues to be used in fishing sinkers. One of a potential of alternate metals having a high specific gravity is bismuth. Unfortunately, bismuth is a fragile metal that renders it unsuitable for use in fishing sinkers in most cases due to the difficulty of extracting a bismuth sinker from a mold cavity. Bismuth has been alloyed with various metals such as tin for use in waterfowl shot. For example, the Griffin U.S. Pat. No. 5,719,352 suggest one should alloy bismuth with tin or lead and the article by Brown points out that the use of bismuth tin alloys in shot for waterfowl hunting has been increasing since 1994 with the waterfowl shot comprising a bismuth alloy of 97% bismuth and 3% tin. Alloys suitable for waterfowl shot are not necessarily suitable for fishing sinkers, since use of a bismuth alloy in shot is a one time event and the use of a sinkers involves subjecting the sinker to repeated abuse with the sinker retaining its integrity over a period of use.

In addition to the problem of fragility of bismuth, bismuth alloys, which might be lighter and potential less fragile, are difficult and time consuming to cast since certain bismuth alloys expand as they solidify. The expansion causes the solidified object to adhere to the mold, which males it a difficult and time consuming to extract the solidified object from the mold. If one is making multiple items, such as inexpensive fishing sinkers, it becomes prohibitively expensive to individually extract each sinker from the mold. The present invention provides a bismuth alloy sinker of sufficient integrity as well as a method of casting multiple bismuth alloy sinkers that allows one to quickly and easily remove the solidified sinkers from the mold.

Thus, in one embodiment the present invention provides an environmental friendly sinker by alloying bismuth with another metal to takes advantage of the high specific gravity of bismuth while the alloying of the metal with bismuth produces a sinker of sufficient strength and integrity so as not to break and of sufficiently high specific gravity so that the sinker will sink itself as well as fishing tackle connected thereto.

DESCRIPTION OF THE PRIOR ART

U.S. Pat. 5,851,482 discloses the use of lead-free ally for use as a solder for copper and copper alloy with the alloy containing tin, bismuth, and either antimony of zinc added to provide a low melting temperature.

U.S. Pat. 5,081,786 discloses a method of constructing fishing lures wherein the alloy is about 90–94% tin with about 4–8% antimony.

U.S. Pat. 5,760,331 discloses a non-lead material for use in making bullets.

U.S. Pat. No. 5,421,901 discloses a fishing lure made from lead with amounts of tin and/or antimony.

U.S. Pat. No. 5,537,775 discloses a weighted fish hook.

U.S. Pat. No. 5,081,997, 5,201,314, and 5,289,831 disclose an echogenic device material and method that uses a radio opaque matter that contains bismuth that the inventor suggests could be used in fishing lures.

U.S. Pat. No. 5,786,416 discloses a high specific gravity material for use in shot or fishing which includes a thermoplastics polymer and tungsten powder. The inventor indicates that the use of other metals which contain bismuth are not suitable for use in the configuration of fishing sinkers.

U.S. Pat. No. 5,719,531 discloses a low toxicity shot or bullet that is made of molybdenum and tungsten particles in a polymer matrix. He sates that bismuth is too weak and brittle and can only be alloyed into a usable shot if it is alloyed with either tin or lead.

The 1997 article titled "Bismuth" by Robert Brown, Jr. suggest that bismuth be used as a replacement for lead in shot used for waterfowl hunting and suggest that alloys of 97% bismuth and 3% tin can be used in making shot for waterfowl hunting.

BRIEF SUMMARY OF THE INVENTION

Briefly, the present invention comprises a fishing sinker having a body of material formed from bismuth or an alloy of bismuth and a method of casting a bismuth or bismuth alloy sinker in order to have the sinker release from the mold as well as a method of forming a runner attachment to the fishing sinker to enable quick and clean removal of a solidified runner from the solidified fishing sinker.

DESCRIPTION OF THE PREFERRED EMBODIMENT

Figure 1:
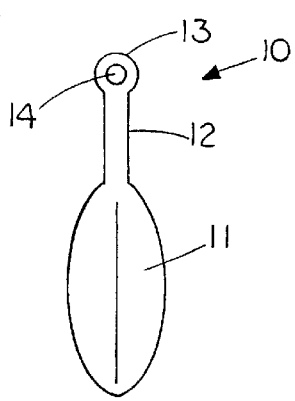
FIG. 1 shows a perspective view of a non-configurable fishing sinker.

Referring to the drawings, FIG. 1 shows a non-configurable fishing sinker 10 having a body 11, a neck 12 and a head 13 with a support 14 for attachment of a fishing line therethrough. The mass of the fishing sinker provides the weight for sinking the fishing sinker and any tackle items connected thereto. The support 14 allows one to secure the fishing line thereto by tying or sliding engagement therewith. Support 14 is shown as having an opening or eye but could be a hook or other type of fasteners for attachment of a fishing line thereof.

Figure 2:
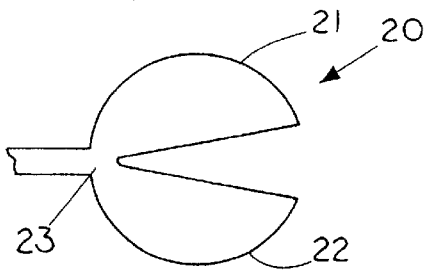
FIG. 2 is a perspective view of a configurable fishing sinker.

FIG. 2 is a perspective view of a configurable fishing sinker 20 having a top half 21 and a bottom half 22 that are hinged together by material 23. In operation of the configurable fishing sinker the fishing sinker is sufficiently malleable so that, one can bring half 21 and half 22 together to clamp a fishing line therebetween by merely squeezing the two halves together with finger pressure.

In order to provide an environmental friendly fishing sinker it is preferred that the fishing sinker should have a specific gravity of at least 7.75, which provides sufficient weight to allow the fishing sinker to sink a fishing line and associated tackle, and be made from a non-toxic metal. Bismuth, which is considered non-toxic, has a specific gravity of about 9.8 which would make it a suitable substitute for lead. Unfortunately bismuth is a brittle metal which can shatter under normal use in fishing or retain sharp edges that can cut the fishing line. Consequently, bismuth while having a suitable high specific gravity for numerous sinker applications lacks the necessary structural integrity for use in certain fishing sinkers. The present invention comprises a bismuth fishing sinker or a bismuth alloy fishing sinker wherein bismuth is alloyed with a high specific gravity metal to provide a less brittle sinker. More specifically, it has been found that one can alloy bismuth with another metal to increase the strength of the bismuth alloy. It has been found that if one alloys bismuth with another high specific gravity alloy such as tin one can achieve both the desired specific gravity as well as the necessary structural integrity for a fishing sinker. Tin has a specific gravity of about 7.3 and alone is generally considered to light for use a fishing sinker. In the present invention it has been found that if tin is alloyed with bismuth one can produce a fishing sinker of sufficiently high specific gravity and of sufficient integrity to with stand the abuse the sinker can encounters when striking rocks and obstructions during the fishing process.

In general if a fishing sinker has a specific gravity of at least 7.75 it is considered by most fisherman to have a suitable specific gravity for use in replacement of lead sinkers. Because of the high specific gravity of bismuth increasing the amount of bismuth in a bismuth alloy can increase the specific gravity of the bismuth alloy. Unfortunately, problems in casting occur when the percentage of bismuth increases. That is, as the percentage of bismuth in the alloy begins to exceed about 48% it is difficult to remove a cast article from a mold as the cast article adheres to the mold. Consequently, the most desirable bismuth alloys are not suitable for mass production.

A particular suitable alloy that provides a specific gravity suitable for use as a fishing sinker is the eutectic alloy of bismuth and tin which comprises about 58% bismuth and 42% tin and has a specific gravity of about 8.7. A further example of a bismuth alloy is the alloying of antimony with bismuth and tin to create a bismuth-tin-antimony alloy that has less frangibility than bismuth metal. Another example of a bismuth alloy is a bismuth-tin-silver alloy where silver is added to the bismuth-tin alloy to provide more ductility and less shatterability to the fishing sinkers. The alloying of additional metals to improve the ductility is particularly helpful with the configurable sinkers that require the body of the sinker to be bent to attach the line to the sinker. However, a problem with molding fishing sinkers containing bismuth alloys is the solidification expansion of the sinker during the solidification phase, which makes it difficult to remove the solidified sinker from the mold. Unfortunately, the higher the bismuth content the more difficult is to extract a solidified sinker from the mold.

Figure 3:
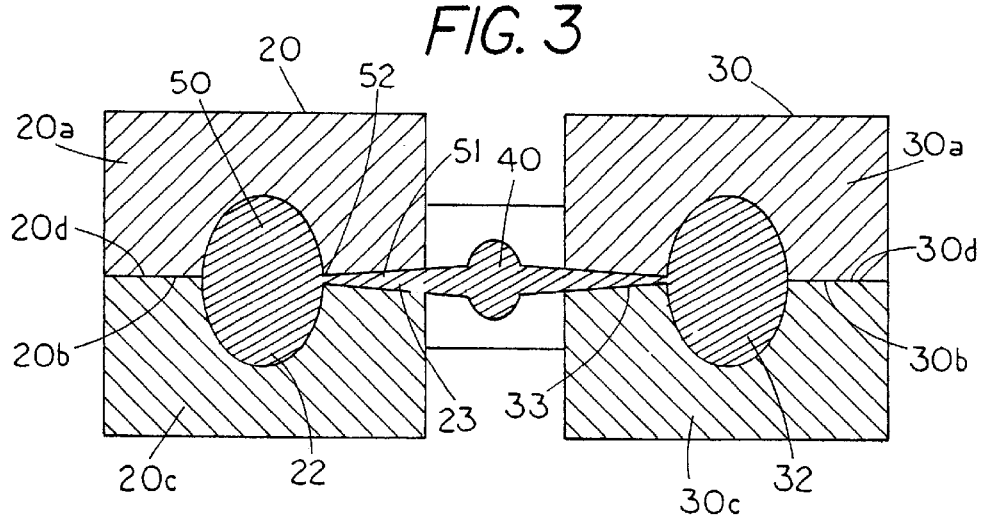
FIG. 3 shows a cross sectional view of a pair of fishing sinker molds that are connected to runners for supplying molten metal to the fishing sinker cavity.

In order to understand the molding of a sinker with the present invention reference should be made to FIG. 3 which shows a cross sectional view of a pair of fishing sinker molds 20 and 30. Mold 20 has a top half 20a with a mating surface 20b for mating with a mating surface 20d on mold 20c. Mold 20a and 20c define a fishing sinker cavity 22 with a runner cavity 23 formed at the parting sur between mold 20a and mold 20c. The runner cavity 23 is connected to mold cavity 32 for supplying molten metal to the fishing sinker cavity 32. Similarly, mold 30 has a top half 30a with a mating surface 30b for mating with a mating surface 30d on mold 30c. Mold 30a and 30c define a sinker body cavity 32 with a runner cavity 33 formed at the parting surface between mold 30a and mold 30c.

Located between molds 20 and 30 is a housing holding the supply of molten metal 40 which extends into mold cavity 22 and 32.

Figure 4:
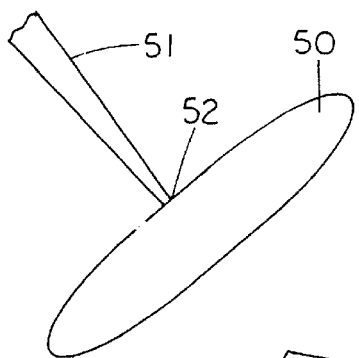
FIG. 4 shows a perspective view of a solidified sinker with a portion of the solidified runner cantilevlerly extended therefrom.

FIG. 4 shows a perspective view of a solidified sinker 50 with a portion of the solidified runner 51 cantilevlerly extended therefrom. That is the molten metal in runner 23 and the molten metal in sinker cavity 22 have solidified as a unitary part.

Figure 5:
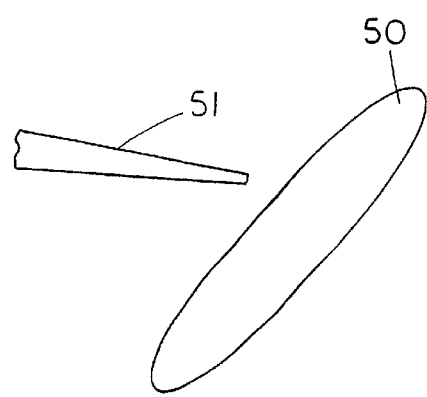
FIG. 5 shows a perspective view of the solidified sinker with the portion of the solidified runner having been broken free from the sinker body.

FIG. 5 shows a perspective view of the solidified sinker 50 with a portion of the solidified runner 51 having been broken free from the sinker body 50. That is by having the runner 23 point of attachment to the body of the sinker as the smallest cross sectional area of the runner one creates a weak spot where one can break the solidified sinker 50 free from the solidified runner 51 leaving a finished sinker 50. Consequently, a plurality of sinkers can be cast in a single process by allowing the runners and sinkers to solidify and then removing both the runner and the sinkers from the mold which leaves both the runner cavity 23 and the sinker body cavity 22 ready for reuse. One can then break the sinker 50 free of the runner 51. The solidified runner 51 can then be recycled for reuse.

Thus the present invention includes a method of casting a bismuth alloy fishing sinker by forming a plurality of molds 20 and 30. As the method for each mold is identical only the method for mold 20 will be described.

Mold 20 has at least two parts 20a, 20c that form a partial sinker cavity with each of the partial sinker cavities coacting to form a complete sinker mold cavity 22 so that separation of each of the molds along surface 20b and 20d allows for removal of a solidified fishing sinker 50 as a unit from the sinker mold cavity 22. The runner cavity 23 for directing a molten bismuth alloy into mold cavity 22 is also defined partially in each of the mold parts 20a and 20c so that separation of each of molds 20a and 20c allows removal of a solidified runner 51 as a unit from the mold parts 20a and 20c. In order to provide for clean and easy removal of runner 51 from a solidified sinker, runner cavity 23 has a minimum cross sectional area occurring at a junction 52 of the runner to sinker mold cavity 22 so that the solidified runner 51 cantilevers outward from the solidified fishing sinker 50 to enable the separation of the solidified fishing sinker 50 from the solidified runner 51 by breaking the solidified fishing sinker free of the runner 51 as illustrated in FIGS. 4 and 5. Generally, the minimum cross sectional area is maintained sufficiently large so that the web connecting the solidified runner to the solidified fishing sinker will support the solidified sinker as the solidified sinker and solidified runner will remain as a unit when both are removed from the mold.

In the preferred embodiment, one die casts the sinkers in a steel mold. As mentioned previously one of the difficulties casting bismuth alloy with a high percentage of bismuth is when a bismuth alloy cools it does not shrink free of the mold thereby making it difficulty to release the sinker from the mold. Generally, the higher percentage of bismuth the greater amount of solidification expansion of the bismuth alloy. On the other hand decreasing the amount of bismuth which generally decrease the solidification expansion of the bismuth alloy decreases the specific gravity of the bismuth alloy and therefore makes it less desirable for use as a fishing sinker.

The present invention provides a method to obtain a clean mold release with an alloy having a high percentage of bismuth. In the present invention a mass or a charge of a bismuth alloy is heated to a temperature well in excess of the normal pouring or injection temperature of the bismuth alloy. By heating a given charge of a bismuth alloy to a sufficiently high temperature and then injecting the bismuth alloy into the mold at the high temperature the thermal contraction of the metal during the cooling of the molten metal from the mold injection temperature to the solidification phase can be used to offset the solidification expansion of the bismuth alloy.

By injecting the bismuth alloy in a superheated condition, i.e. at a temperature $T_s$ which is well above the normal pouring temperature $T_p$, one injects the molten bismuth alloy in an expanded volume condition due to thermal expansion of the molten bismuth alloy in the liquid phase. As the alloy cools from the superheated condition to the solidification temperature the volume of the bismuth alloy contracts until it reaches the solidification temperature. As the alloy goes rough the solidification phase the volume of the alloy expands. However, by heating the liquid bismuth alloy to a temperature well in excess of the normal pouring temperature and injection the bismuth alloy in a superheated condition into the mold cavity one can use the thermal contraction of the bismuth alloy in the liquid phase to offset the thermal expansion of the bismuth alloy during the solidification of the bismuth alloy. That is, one finds that upon cooling the solidified alloy shrinks to a volume $V_s$ which is less than the mold volume $V_m$. By using the thermal contraction of the superheated bismuth alloy one can cast a sinker that contracts upon solidification and thus can be easily removed from the mold.

In summary, by increasing the temperature of the molten bismuth or bismuth alloy sufficiently one can expand the volume of the molten bismuth or bismuth alloy sufficiently so that when the bismuth or bismuth alloy cools the thermal contraction in the molten state is sufficient to offset the thermal expansion of the bismuth or bismuth alloy during solidification of the bismuth or bismuth alloy. While the exact temperature of superheated molten metal depends on the size and shape of the cast sinker as well as the amount of bismuth an operator can determine the proper pouring temperature of the bismuth or bismuth alloy by heating the molten bismuth or bismuth alloy and injecting it into the mold to determine if the cast article will release from the mold. If it does not release, the operator can raise the temperature of the molten bismuth or bismuth alloy until the cast article easily releases from the mold.

To illustrate the method of the present invention with a bismuth alloy a charge of a bismuth alloy comprising an eutectic mixture of bismuth tin (about 58% bismuth and 42% tin) which has a solidification temperature of 281° degrees Fahrenheit was heated to a superheated condition of 850° F. to cause the eutectic mixture to expands to a volume $V_p$. The bismuth alloy, which was at 850° F. was then injected in a mold of volume $V_m$. As the molten metal cooled the volume of the metal contracted until solidification occurred whereupon the volume of the metal increased but not sufficiently so that the volume of the metal in the mold in the expanded state was equal to or greater than the volume $V_m$ of the mold. The molten metal, which had been injected into the mold at a temperature of about 850° F. was allowed to solidify. As the molten metal cooled from 850° F. to the temperature of removal of the article from the mold the volume of the alloy remained below the volume of the mold $V_m$ thus ensuring that the sinker was easy to remove from the mold. Thus by heating the bismuth alloy to a temperature about 600 degrees above the solidification temperature one was able to expand the bismuth alloy to a condition whereupon the contraction during cooling to the solidification state was greater than the solidification expansion.

Thus, depending on the configuration and size of the cast sinker the molten metal is heated to a temperature sufficiently high so that the volume of metal expands sufficiently so that when the molten metal cools to a sinker extraction temperature the volume of the metal is slightly less than the volume of the mold cavity thereby allowing easy removal of the sinker from the mold.

The present invention includes an improved fishing sinker having a specific gravity sufficiently high so as to provide sufficient weight without undue bulkiness to the fishing sinker. If an eutectic mixture of bismuth and tin are used, one can obtain a specific gravity of 8.7 which is only slightly below the specific gravity of lead.

We claim:

1. The method of making a bismuth alloy fishing sinker comprising the steps of:

forming a first mold for a defining a first cavity with said first mold having a mold mating surface;

forming a second mold for defining a second cavity with said second mold having a mold mating surface so that when said mold mating surface of said first mold is joined to said mold mating surface of said second mold the first mold and the second mold cooperate to define a fishing sinker mold cavity;

forming a runner cavity to said fishing sinker mold cavity with said runner cavity to said fishing sinker mold cavity located at a junction between said first mold and said second mold so that said first mold and said second mold can be separated from each other with at least part of the runner cavity in each of said first mold and said second mold;

superheating a bismuth alloy until a molten charge of the bismuth expands to a volume which is greater than a volume expansion of the bismuth alloy during a subsequent solidification step to allow the thermal contraction of the bismuth alloy in the liquid phase to offset a thermal expansion of the bismuth alloy during the solidification step of the bismuth alloy;

injecting the molten bismuth alloy into the runner cavity and into the fishing sinker mold cavity;

allowing the molten bismuth alloy to solidify in the runner cavity and the fishing sinker mold cavity;

separating the first mold and the second mold to leave a solidified fishing sinker with a solidified runner cantileverly attached thereto; and separating the solidified fishing sinker from the solidified runner at the junction of the solidified sinker and the solidified runner.

2. The method of claim 1 wherein the junction of the runner cavity to the mold cavity comprises a minimum cross sectional area of the runner cavity.

3. The method of claim 1 wherein the runner cavity is located partially in the first mold and partially in the second mold with the termination of the runner cavity at a parting line between the first mold and the second mold.

4. The method of claim 1 wherein the liquid bismuth alloy comprises at least 48% bismuth.

5. The method of claim 1 wherein the bismuth alloy comprises an eutectic mixture of bismuth and tin.

6. The method of claim 1 wherein the bismuth alloy includes either antimony or silver.

7. The method of casting an environmental friendly fishing sinker containing bismuth;

heating a charge of bismuth having a solidification expansion until the bismuth reaches a molten state;

superheating the bismuth in the molten state to produce a thermal expansion of the bismuth in the molten state until the amount of the thermal expansion is greater than the solidification expansion so that when the superheated bismuth injected into a sinker mold cavity the amount of thermal contraction of the molten bismuth as the molten bismuth cools to a solidification temperature exceeds the solidification expansion so that a solidified fishing sinker in the sinker mold cavity does not adhere to the mold.

8. The method of claim 7 wherein the step of heating includes heating a bismuth alloy of at least 48% bismuth and the balance tin.

9. The method of claim 8 wherein the step of heating a bismuth alloy comprises heating a eugenic alloy of bismuth and tin.

10. The method of claim 8 including superheating the bismuth alloy in the molten state to a temperature at least 600° F. above a solidification temperature of the bismuth alloy.

11. The method of casting a bismuth alloy;

superheating a bismuth alloy until a molten charge of the bismuth alloy expands to a volume which is greater than a volume expansion of the bismuth alloy during a subsequent solidification step; and then pouring the superheated bismuth alloy into a mold so that upon cooling to a removal temperature the contraction of molten bismuth alloy exceeds the volume expansion to thereby prevent a solidified article in the mold from adhering thereto.

12. The method of claim 11 wherein a bismuth alloy is cast in the shape of a fishing sinker; and the bismuth alloy includes at least 48% bismuth.

* * * * *